United States Patent
Gottin et al.

(10) Patent No.: US 10,409,931 B1
(45) Date of Patent: Sep. 10, 2019

(54) AUTOMATIC COMBINATION OF SUB-PROCESS SIMULATION RESULTS WITH DATASET SELECTION BASED ON FITNESS UNDER SPECIFIC SCENARIOS

(71) Applicant: EMC IP Holding Company LLC, Hopkinton, MA (US)

(72) Inventors: Vinícius Michel Gottin, Rio de Janeiro (BR); Angelo E. M. Ciarlini, Rio de Janeiro (BR); André de Almeida Maximo, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 131 days.

(21) Appl. No.: 15/363,308

(22) Filed: Nov. 29, 2016

(51) Int. Cl.
*G06F 17/18* (2006.01)
*G06F 17/50* (2006.01)
*G06F 16/903* (2019.01)

(52) U.S. Cl.
CPC .... *G06F 17/5009* (2013.01); *G06F 16/90335* (2019.01); *G06F 17/18* (2013.01)

(58) Field of Classification Search
CPC . G06F 17/5009; G06F 17/18; G06F 17/30979
USPC .......................................................... 703/2
See application file for complete search history.

(56) References Cited

PUBLICATIONS

Clarke et al., "Automatic Verification of Finite-state Concurrent Systems Using Temporal Logic Specifications", ACM Trans. Program. Lang. Syst., 8(2), 244-263., doi: 10.1145/5397.5399, (Apr. 1986).

Dechter et al., "Generalized Best-first Search Strategies and the Optimality of A*", J. ACM, 32(3), 505-536. doi 10.1145/3828.3830 (Jul. 1985).

Dechter et al., "The optimality of A*", Search in Al. Amsterdam.

Maximo et al., "Automatic Combination of Massive Simulation Results and Heterogeneous Data Sources", U.S. Appl. No. 15/223,472, filed Jul. 29, 2016.

Evett et al., "PRA*: Massively Parallel Heuristic Search", Journal of Parallel and Distributed Computing, 2(25), 133-143 (1995).

*Primary Examiner* — Saif A Alhija
(74) *Attorney, Agent, or Firm* — Ryan, Mason & Lewis, LLP

(57) ABSTRACT

Techniques are provided for automatic combination of sub-process simulation results with dataset selection based on a fitness under one or more specific scenarios. An exemplary method comprises obtaining an execution map for each sub-process in a sequence that stores results of a given sub-process execution. The results comprise a scenario, a distribution and a distribution fitness value. In response to a user query regarding a target feature and an initial dataset, initial dataset are combined with results selected from the execution map for a first sub-process in the sequence; each available dataset from the previous sub-processes in the sequence is combined with results selected from the execution map for the next sub-process; a probability distribution function (pdf) for the target feature is composed from a combined dataset that represents a simulation of the process and combines results of each of sub-process in the sequence; and the pdf is processed to answer the user query for the target feature.

20 Claims, 15 Drawing Sheets

| $H_1^A$ month | $c$ | $O_1^A$ (avg_process_time, rt_containers) |
|---|---|---|
| (jan) | 5 | (50h, 20%) |
| | 10 | (50h, 80%) |
| | 15 | (100h, 20%) |
| | 15 | (100h, 80%) |

*GeneratePDF(hist):*
1. *total_counts* = 0
2. *for (c, Q) in hist:*
3.     *total_counts* = *total_counts* + c
4. *res_hist* = [ ]
5. *for (c, Q) in hist:*
6.     *append(res_hist,* ($\frac{c}{total\_counts}$, Q))
7. *return res_hist*

FIG. 7

MPPCompose($s_0$, threshold, $n$):
1. $ini\_hist \leftarrow [(1, s_0)]$
2. $frontier \leftarrow \textbf{add}(frontier, (1.0, 1.0, ini\_hist, 1))$
3. do:
4.    (_, $curr\_fit, curr\_hist, curr\_index$) $\leftarrow \textbf{first}(frontier)$
5.    if $curr\_index > n$:
6.       return ($curr\_fit, curr\_hist$)
7.    $all\_matches \leftarrow \textbf{GenMatches}(curr\_hist, curr\_index, threshold)$
8.    for each match in $all\_matches$:
9.       ($efit, cand\_fit, cand\_hist$) $\leftarrow \textbf{ComputeHistogram}(curr\_fit, match, curr\_index)$
10.      if $cand\_fit > threshold$:
11.        $frontier \leftarrow \textbf{add}(frontier, (efit, cand\_fit, cand\_hist, curr\_index + 1))$
12. while (not $\textbf{empty}(frontier)$)
13. return (0, [])

FIG. 8

GenMatches($H, index, threshold$):
1. $all\_pairs \leftarrow [\,]$
2. for each $(c, Q)$ in $H$:
3.    $pairings \leftarrow [\,]$
4.    for each $M$ in $\mathbb{M}_{index}$:
5.      $fit \leftarrow \textbf{\textit{EvaluatePreferences}}(M, Q, index)$
6.      if $fit > threshold$:
7.        $\textbf{\textit{append}}(pairings, ((c, Q): (fit, M[Q])))$
8.    $\textbf{\textit{append}}(all\_pairs, pairings)$
9. return $\textbf{\textit{GenAlternatives}}(all\_pairs, [\,])$

FIG. 9

*GenAlternatives(Pairs, Past):*
1. *alternatives* ← [ ]
2. *L* ← first(*Pairs*)
3. for each *e* in *L*:
4.    *curr* ← concat(*Past, e*)
5.    *alternatives* ← extend(*alternatives*, GenAlternatives(*Pairs, curr*))
6. return *alternatives*

FIG. 10

ComputeHistogram(*curr_fit, match, index*):
1. $res\_hist \leftarrow []$
2. $res\_fit \leftarrow 0.0$
3. $total\_counts \leftarrow 0$
4. for each $(c_i, Q_i): (f_j, next\_hist)$ in *match*:
5. $\quad total\_counts \leftarrow total\_counts + c_i$
6. $\quad res\_fit \leftarrow res\_fit + (c_i * f_j)$
7. $\quad$ for each $(c_j, Q_j)$ in *next_hist*:
8. $\quad\quad c_n \leftarrow c_i * c_j$
9. $\quad\quad Q_n \leftarrow \mathbf{merge}(Q_i, Q_j)$
10. $\quad\quad \mathbf{append}(res\_hist, (c_n, Q_n))$
11. $res\_fit = curr\_fit * res\_fit * \left(\frac{res\_fit}{total\_counts}\right)$
12. $heuristic\_fit \leftarrow res\_fit * \mathbf{EstimateFit}(res\_hist)$
13. $\mathbf{group\_by}(res\_hist, \mathbf{GetFutureFeatures}(index))$
14. return $(heuristic\_fit, res\_fit, res\_hist)$

FIG. 13

AUTOMATIC COMBINATION OF SUB-PROCESS SIMULATION RESULTS WITH DATASET SELECTION BASED ON FITNESS UNDER SPECIFIC SCENARIOS

CROSS-REFERENCE TO RELATED APPLICATIONS

The present application is related to U.S. patent application Ser. No. 15/223,472, filed Jul. 29, 2016, entitled "Automatic Combination of Sub-Process Simulation Results and Heterogeneous Data Sources," incorporated by reference herein.

FIELD

The field relates generally to simulation of combinatorial processes, such as logistics processes, and more particularly, to techniques for summarizing and querying data related to such simulations.

BACKGROUND

Simulation systems typically support decision making, allowing a specialist user to observe one or more sequential sub-processes without actually performing the related activities in the real world. Supply chain management is one example of a process comprised of sequential sub-processes that uses simulation.

Simulation applications are typically characterized by features of the domain that are shared by the sub-processes and drive queries of the user. The features define the relevant aspects for the execution of sub-processes, such as the available resources, and the relevant information for decision making, such as the time to complete each activity. Typically, the level of detail of the entire simulation process is chosen based on its target features (i.e., specific simulation behaviors that can be quantified and are important for analysis and decision making).

The sub-processes within the entire process are often managed and operated by different agents, using distinct tools and information systems. In addition, multiple simulation models are typically built over time, for different goals and covering different sub-processes. The execution of these models generates multiple datasets, each representing the workings of part of the complete process under a specific scenario. Thus, there are multiple, heterogeneous, data sources, such as simulation results, or logs with observations from the real world, providing information on how each of these sub-processes operates.

U.S. patent application Ser. No. 15/223,472, filed Jul. 29, 2016, entitled "Automatic Combination of Sub-Process Simulation Results and Heterogeneous Data Sources," incorporated by reference herein, provides a method for generating a probability distribution function of a target feature of the domain based on these heterogeneous results, without having to create and execute a unified simulation. By doing this, results can be obtained when such unified simulation is not available and, even when it is available, it is possible to approximate results accurately and much more quickly than executing a complete simulation.

A need exists for improved techniques for composing probability distribution functions of a target feature from simulation results and real-world observations.

SUMMARY

Illustrative embodiments of the present invention provide methods and apparatus for automatic combination of sub-process simulation results with dataset selection based on a fitness under one or more specific scenarios. In one exemplary embodiment, a method comprises the steps of obtaining, for a process comprised of a sequence of a plurality of sub-processes, an identification of one or more relevant input features and output features for each of the sub-processes; obtaining at least one execution map for each of the sub-processes, wherein each execution map stores results of at least one execution of a given sub-process originated from at least one data source, and wherein the results comprise a scenario, configured by a substantially same tuple of input features, a distribution, configured by a count of a number of times a given tuple of output features appeared given the scenario, and a fitness value of the distribution as being representative of at least one of the sub-processes under the scenario; and, in response to one or more user queries regarding at least one target feature, selected among features of the sub-processes, and an initial dataset comprised of a user-provided initial scenario comprising values of the one or more relevant input features of a first sub-process, performing the following steps: combining the initial dataset with one or more results selected from the at least one execution map for a first sub-process in the sequence of sub-processes, by matching the input features of the one or more results with features from the initial dataset, yielding one or more combined datasets with an evaluated fitness; combining, for each next sub-process in the sequence of sub-processes, each available dataset from the combination of previous sub-processes in the sequence of sub-processes, with one or more results selected from the at least one execution map for the next sub-process, by matching the input features of the one or more results with features from the initial dataset or from results selected from execution maps of a previous sub-process in the sequence, yielding one or more combined datasets with an evaluated fitness; composing a probability distribution function for the at least one target feature from one of the combined datasets that represents a simulation of the process and combines one or more results of each of sub-process in the sequence; and processing the probability distribution function to answer the one or more user queries for the at least one target feature.

In one or more embodiments, the combining comprises, for a given one of the sub-processes, collecting possible matches between values of output features in the available dataset and input features in the at least one execution map of the given sub-process. In at least one embodiment, the collecting only collects possible matches satisfying a pre-defined fitness threshold. In an exemplary embodiment, the collecting further comprises one or more of adjusting a pre-calculated fitness value of one or more datasets based on an evaluation of one or more preferences defined by the user for the process and limiting the number of execution maps for a next sub-process in the sequence of the plurality of sub-processes to be paired with output features in the available dataset.

In at least one embodiment, the step of combining available datasets with one or more results selected from execution maps of the at least one execution map comprises combining the available datasets with the possible matches. In one or more embodiments, the combining further comprises one or more of (i) determining a heuristic fitness value; (ii) grouping the distribution in the resulting datasets by the features that are still necessary in subsequent sub-processes; (iii) processing a plurality of the possible matches in parallel; and (iv) prioritizing a computation of the available datasets with a substantially highest heuristic fitness value.

In one or more embodiments, a plurality of the available datasets are optionally processed in parallel. In at least one parallel embodiment, the combining further comprises one or more of a synchronicity mechanism in the collecting of the results of the parallel processing of the available datasets, substantially ensuring that possible combinations are made available synchronously; and asynchronously collecting a number of results of the parallel processing of the available datasets, making the collected results available as they are processed, and wherein a probability distribution function is composed with a first available dataset that combines results of at least one execution map of each of the sub-processes in the sequence of sub-processes. The execution maps for the plurality of sub-processes are optionally stored as distributed tables that use the relevant input features to hash data related to multiple executions across multiple nodes.

As noted above, illustrative embodiments described herein provide significant improvements relative to conventional simulation systems by combining results of previous simulations of portions of a simulated process. These and other features and advantages of the present invention will become more readily apparent from the accompanying drawings and the following detailed description.

BRIEF DESCRIPTION OF THE DRAWINGS

FIG. 5 illustrates a table comprising an execution map constructed from source A implementing a particular sub-process, following the example of FIG. 4;

FIG. 7 illustrates exemplary pseudo code of a GeneratePDF process, according to one embodiment of the invention;

FIG. 8 illustrates exemplary pseudo code of a MPPCompose process, according to one embodiment of the invention;

FIG. 9 illustrates exemplary pseudo code of a GenMatches process, according to one embodiment of the invention;

FIG. 10 illustrates exemplary pseudo code of a GenAlternatives process, according to one embodiment of the invention;

FIG. 13 illustrates exemplary pseudo code of a ComputeHistogram process, according to one embodiment of the invention;

DETAILED DESCRIPTION

Figure 1:
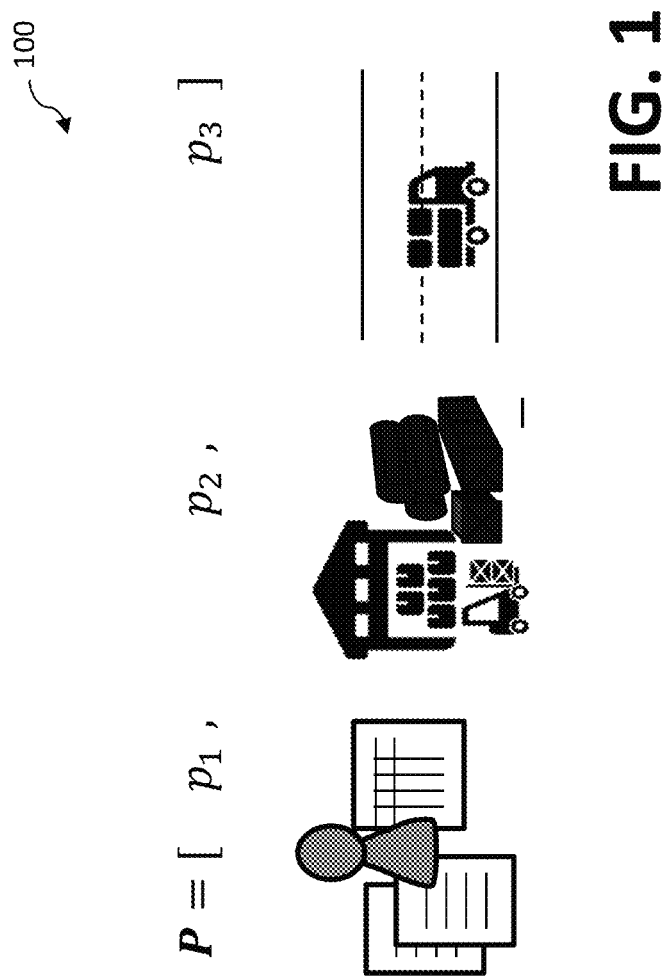
FIG. 1 illustrates an exemplary supply chain logistics domain comprised of three sequential non-overlapping sub-processes.

Illustrative embodiments of the present invention will be described herein with reference to exemplary communication, storage, and processing devices. It is to be appreciated, however, that the invention is not restricted to use with the particular illustrative configurations shown. Aspects of the present invention provide methods and apparatus for automatic combination of sub-process simulation results with dataset selection based on a fitness under one or more specific scenarios.

One or more embodiments of the invention analyze results in scenarios that have not been simulated by combining the results of previous simulations of parts of the process, for example, in an embarrassingly parallel fashion. In one or more embodiments, computer-based simulation of a sequence of one or more sub-processes is performed. While one or more embodiments are described in the context of supply chain logistics, the present invention may be employed in any environment where it is desirable to analyze results in scenarios that have not been simulated by combining the results of previous simulations of portions of the process.

In one or more embodiments, a method is provided that automatically combines massive previously available datasets, such as simulation results, into a probability distribution function (often referred to herein as a pdf) of a target feature. The substantially fittest datasets are automatically selected by the disclosed method for combination, without user intervention.

In at least one embodiment, the exemplary method substantially guarantees the coherence of the resulting distribution by matching input and output features in the datasets starting with those in an initial scenario. The exemplary method optionally leverages massive parallelism to efficiently allow a user to query values of that target feature over the complete process, even if no equivalent complete simulation model is available. The application of massive parallelism and heuristics enables the computation of probability distribution functions of a target feature in query-time, which would be unfeasible with naïve approaches.

In one or more embodiments, datasets can be prioritized and/or penalized in the composition of a probability distribution function of a target feature, given an appropriate formalization. The formalization expresses restrictions and preferences over the trajectory of the complete process regarding the domain features in those datasets. The formalization achieves this effect through the manipulation of the fitness values associated to scenarios.

As noted above, U.S. patent application Ser. No. 15/223,472, filed Jul. 29, 2016, entitled "Automatic Combination of Sub-Process Simulation Results and Heterogeneous Data Sources," incorporated by reference herein, provides a method for generating a probability distribution function of a target feature of the domain based on these heterogeneous results, without having to create and execute a unified simulation. U.S. patent application Ser. No. 15/223,472 introduces an execution map as a data structure that indexes partial simulation results by the input features used to produce them. In one or more embodiments, a specialist user specifies the coherence of the selected sequence of datasets.

In at least one embodiment of the present invention, simulated (or observed) results are represented as execution maps to leverage the knowledge of input and output features contained within them. According to one aspect of the invention, an extended representation of execution maps is employed that includes information of the fitness of the datasets as representatives of the sub-processes under specific scenarios. With this representation, a composition method is presented to automatically search for the substantially fittest sequence of datasets that represents a target feature under a specific user-provided initial scenario, thus obviating the need for a specialist user to predefine the datasets to be used. Such a method is important when there is a large number of alternative datasets for each phase of the process so that finding the substantially fittest combination for a specific scenario becomes a huge combinatorial problem.

In various embodiments, the disclosed method is applicable, given datasets of simulation results in substantially any format, as long as a fitness value and the values for domain features are available. The exemplary method is also capable of considering preferences, in the form of desirable (or necessary) and undesirable (or forbidden) characteristics of the complete process to be represented by the resulting probability distribution function. In one or more embodiments, the influence of these preferences is represented in the algorithms by means of the contextual manipulation of the fitness scores associated with the scenarios in the previously available datasets. This mechanism is particularly useful to answer queries about conditional distribution probabilities of target features when a given set of scenarios is specified (e.g., lead times after a specific bottleneck within a supply chain context).

In at least one embodiment, the combination method leverages a massively parallel search for the substantially fittest combination of datasets in order to generate an accurate probability distribution of the target feature. Since many large datasets might be available for each sub-process, there may be a combinatorial explosion in the number of possible alternatives. This is a typical Big Data problem and the exemplary disclosed method resorts to massive parallelism and heuristics in one or more embodiments to generate results in due time.

Simulation of complex processes, composed of sub-processes and implemented by distinct simulation models and applications, yield large volumes of data. Alternatively, observations from the real world about a sub-process can also be considered. Besides the challenge of extracting features from these large datasets, there is the challenge of finding the best combination of available results to answer a new query. In the context of these massive heterogeneous simulations, the following problems are addressed by the method of this invention.

Composition of "Fittest" Sequence of Simulation Results into Target Feature PDF

U.S. patent application Ser. No. 15/223,472 discloses a method for the automatic combination of partial simulation results and other heterogeneous sources into a probability distribution function of a target feature of the domain. This relates to the problem of combining simulations of a sequence of sub-processes (when building a complete model is unfeasible or impossible) and also to the problem of high costs of running simulations of that sequence. Such a combination allows the user to extrapolate available results in order to quickly obtain distribution probabilities of target variables in new scenarios, even when there is no unified simulation model available.

U.S. patent application Ser. No. 15/223,472 provides the coherence of the distribution probabilities based on user-defined hypothesis about the relationship between the sub-processes. In one or more embodiments, a specialist provides a sequence of applicable datasets. One or more embodiments of the present invention combine massive heterogeneous results substantially without user guidance, combining the substantially fittest possible results into a probability distribution function of the target feature. For this, fitness metrics are assumed that allow a comparison of datasets under specific scenarios.

Finally, an arbitrarily large number of datasets may exist for each sub-process, and the complete process can be composed of many sub-processes. Given the combinatorial nature of this problem, one or more embodiments of the disclosed method apply computational and search-space pruning techniques in order to mitigate the entailed high computational costs. Furthermore, it may be desirable that the disclosed method perform quickly, so as to allow the computation of a probability distribution function over a target feature in real-time.

Consider Preferences and Constraints

The fitness of a given scenario in a dataset may be contextually higher or lower, depending on user preferences, constraints and the scenarios that precede and follow the given scenario. It may be important to allow a specialist user to determine preferences and constraints over the intended trajectory of the complete process represented by the resulting probability distribution function.

Datasets that represent desired events are optionally prioritized (or the only ones considered), while undesired events are optionally penalized (or even forbidden). In one or more embodiments, the composition method allows the treatment of these preferences and constraints in order to answer queries about distribution probabilities under specific circumstances. Answering what-if queries like these may be important for decision making.

Concepts

Assume a complete process represented by a sequence of ordered non-overlapping sub-processes $P=[p_1, p_2, \ldots, p_n]$. Each of these sub-processes may be managed and run by different stakeholders, using different tools and information systems. Additionally, it is common for these sub-processes to be implemented by distinct simulator programs, which consume and generate different data types and represent distinct features of the domain.

Therefore, the behavior of the system is captured and logged by heterogeneous sources, in different formats, sizes and granularities. In the present context, an execution is referred to as a dataset generated by a simulation program, but the methods described also allow for the consideration of historical data, or even user-edit data, as applicable data sources.

FIG. 1 illustrates an exemplary supply chain logistics domain 100 comprised of a sequence of sub-processes P (100) which is comprised of three sequential non-overlapping sub-processes $p_1$, $p_2$ and $p_3$. In the example of FIG. 1, sub-process $p_1$ is the placement of an order in the supply management system; $p_2$ is the warehouse and packaging operation; and $p_3$ is the transportation and delivery of goods to the destination.

Each sub-process $p_i$ is covered by one or more alternative data sources, and each data source may cover a sequence of sub-processes. A data source covering the sequence $p_1$, $p_{i+1}, \ldots, p_{i+k}$ is composed of multiple executions which implement $p_i, p_{i+1}, \ldots, p_{i+k}$ each. Data sources are typically the output of simulation programs for the sub-processes, but they can also correspond to real world data.

Figure 2:
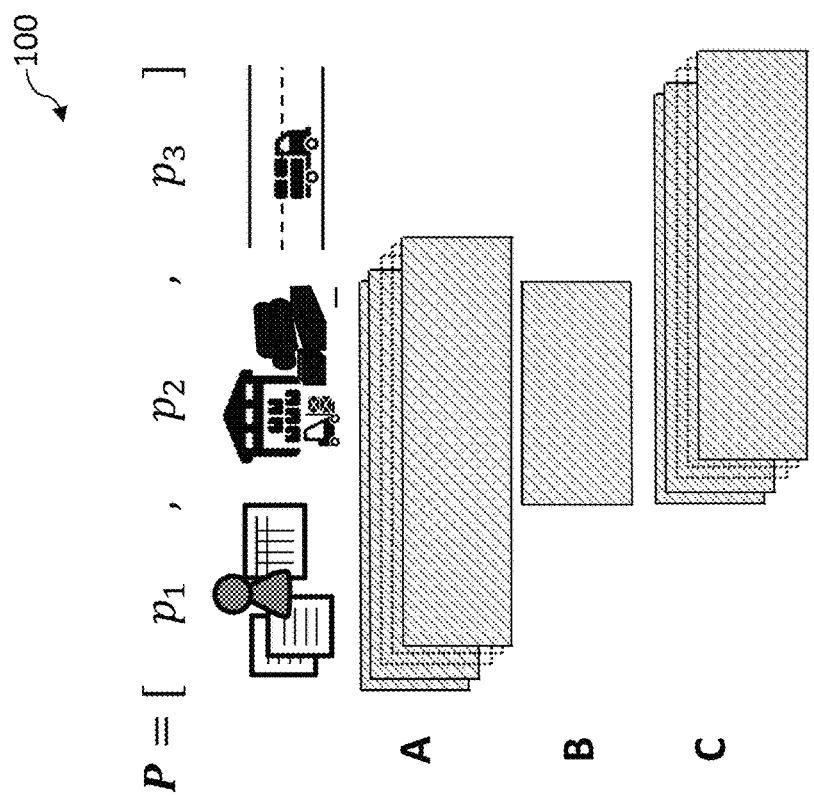
FIG. 2 illustrates three exemplary data sources for the exemplary supply chain logistics domain of FIG. 1.

FIG. 2 illustrates three exemplary data sources A, B and C for the exemplary supply chain logistics domain 100 of FIG. 1. The three exemplary data sources A, B and C correspond to one or more sub-processes $p_i$ of P. In the example of FIG. 2, data source A is a simulation program, the executions of which implement the order generation ($p_1$) and the warehouse operation ($p_2$) sub-processes. Data source B, on the other hand, is a database table recording historical data, the executions of which correspond only to the warehouse operation ($p_2$). Data source C is another simulation program, the executions of which correspond to the warehouse operation ($p_2$) and the transportation and delivery operation ($p_3$).

A data source could in principle correspond to a sequence of sub-processes if its executions generate outputs for each sub-process in the sequence. This means that executions from data source A, in FIG. 2, generate outputs representing the results of $p_1$ and $p_2$. For the sake of simplicity, and without loss of generality, it is assumed that each execution corresponds to a single sub-process. In this sense, the executions from data sources that implement multiple sub-processes are split into separate executions. Hence, the executions from source A in FIG. 2 are 'split' into executions that implement $p_1$ and executions that implement $p_2$.

Through the method described in U.S. patent application Ser. No. 15/223,472, referenced above, the user provides the relevant features of the domain for each sub-process involved and classifies them as either input or output features. The features define the relevant aspects for the execution of sub-processes.

These features are used to aggregate executions relating to a same sub-process $p_i$ into an execution map data structure that indexes the counted results of the executions by the input features used to generate them. $M_i^d$ is defined as an execution map of sub-process $p_i$ from source d.

Figure 3:
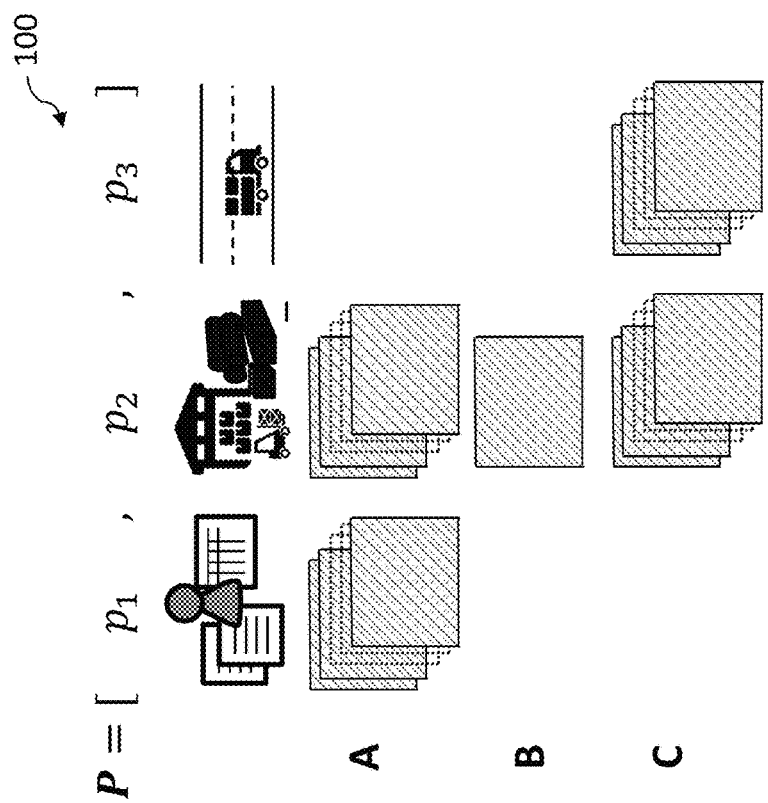
FIG. 3 illustrates the three data sources from the domain of FIG. 2 represented as executions that each implement only one sub-process.

FIG. 3 illustrates the three data sources A, B and C from the domain 100 of FIG. 2 represented as executions that each implement only one sub-process.

Figure 4:
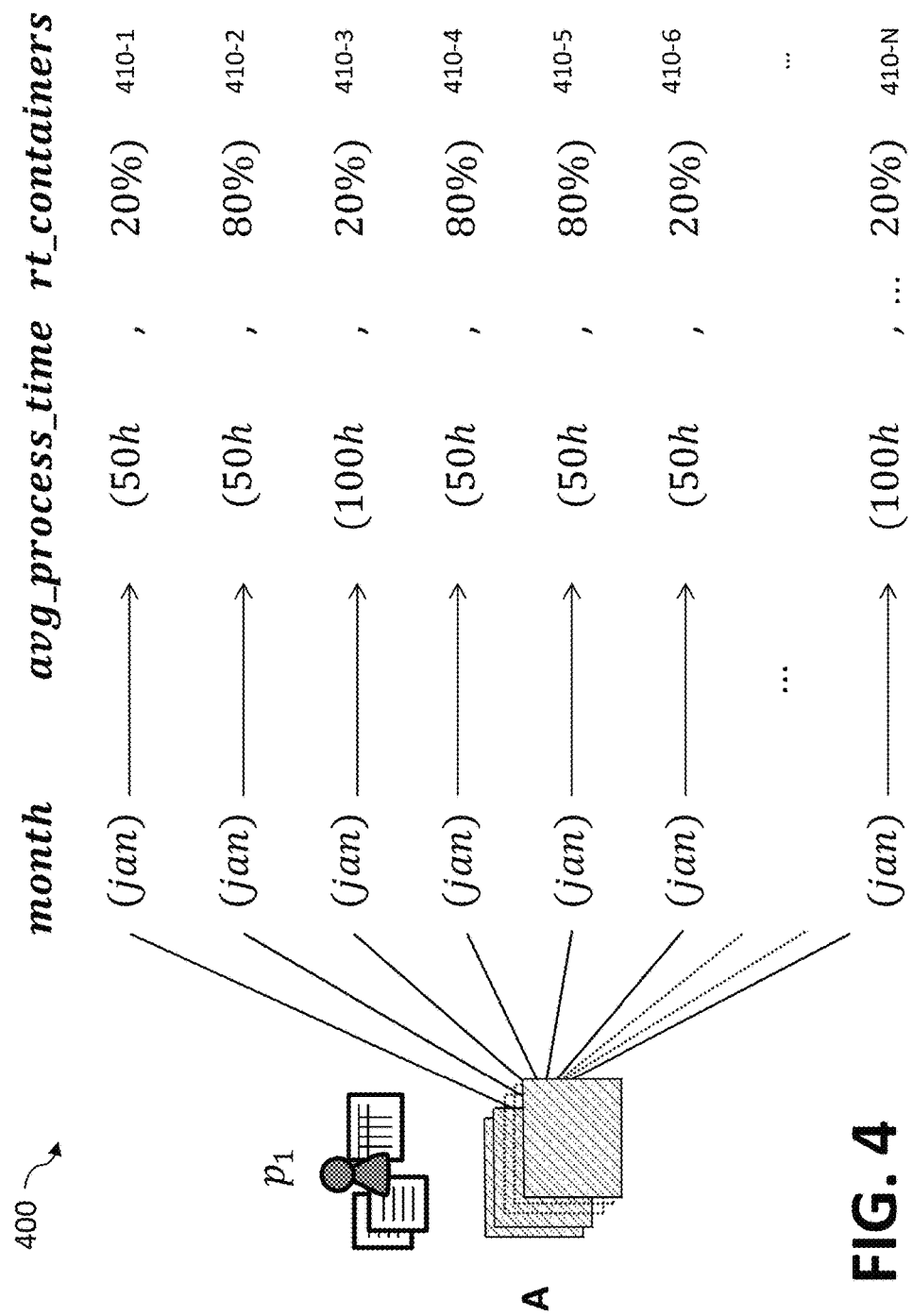
FIG. 4 illustrates an example with multiple executions of a sub-process, where all the executions come from the same simulator program.

FIG. 4 illustrates an example 400 with multiple executions of sub-process $p_1$, where all the executions come from the same simulator program A. Each result 410-1 through 410-N was generated given a value of the input feature month, and for each one, it is possible to compute values for the output features (avg_process_time, rt_containers). The feature avg_process_time represents the average time taken to process an order. The feature rt_containers represents the average container occupation ratio, in percentage of available weight and space.

FIG. 5 illustrates a table 500 comprising an execution map $M_1^A$ constructed from source A implementing sub-process $p_1$, following the example 400 of FIG. 4. Execution map 500 maps input tuples to resulting output tuples in sub-process $p_1$, extracted from source A as a single data source. As shown in FIG. 5, 45 executions of $p_1$ with the input tuple (jan) are presented with several resulting output tuples of the format (c, Q), where c is the count of the number of times a given output tuple appeared given the same input. Each time one of these output tuples appears, its respective counting number c is incremented in the execution map. Real-world applications would typically generate much larger numbers of distinct output tuples.

Consider that each execution $e \in \mathbb{E}$ operates consuming an n-tuple as input and generating an n-tuple as output. A tuple q is an ordered sequence of n values of features $T_j$, with $1 \leq j \leq n$, such that $q = (q_1, q_2, \ldots, q_n) \in T_1 \times T_2 \times \ldots \times T_n$. Let $\mathbb{T}(q)$ be the schema, that is, the composition of features $T_1 \times T_2 \times \ldots \times T_n$ for any given tuple q. For ease of representation, such a tuple is expressed as $q = (T_1:q_1, T_2:q_2, \ldots, T_n:q_n)$.

Let q be the input tuple for an execution $e \in \mathbb{E}$ $\mathbb{I}(e)$ is referred to as the input schema of e, defined by $\mathbb{I}(e) =^{def} \mathbb{T}(q)$. Similarly, let r be the output tuple for e. $\mathbb{O}(e)$ is referred to as the output schema of e, defined by $\mathbb{O}(e) =^{def} \mathbb{T}(r)$.

Figure 6:
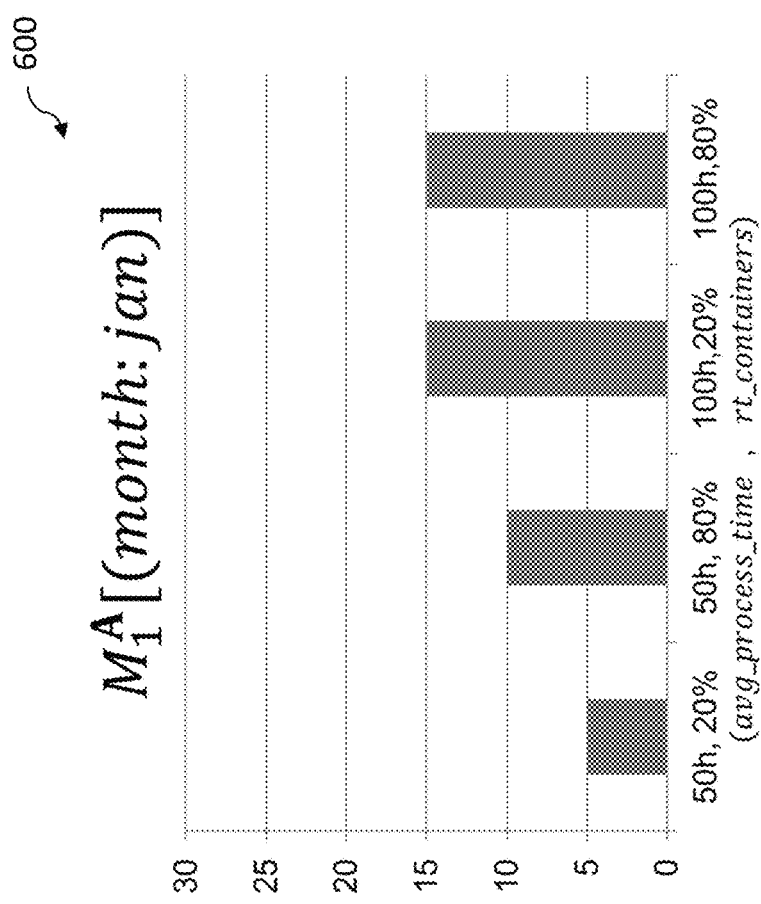
FIG. 6 is a histogram of the results of a particular sub-process $p_1$ given a specified input.

The notation $M_i^d[q]$ refers to the resulting histogram obtained from the map $M_i^d$ for a given input tuple q. $M_i^d[q]$ is valid if q exists as input tuple in $M_i^d$, and invalid otherwise. FIG. 6 is a histogram 600 of the output tuples of the sub-process $p_1$ given by the input tuple (month: jan) in execution map $M_1^A$, following the previous example in FIG. 5.

It is noted that this input tuple may contain more features than there are in the input features of the execution map and still make $M_i^d[q]$ valid. For example, regardless of the value z of a feature $T_z$, $M_1^A[(\text{month: jan}, T_z:z)]$ results in the same distribution as $M_1^A[(\text{month: jan})]$, because $T_z$ is not part of $\mathbb{I}_1^A$.

The concept of a scenario is formalized based on this representation of domain-relevant features. Intuitively, a scenario configures a certain situation in the domain, a context of operation of the process. A scenario Y is a tuple $(T_0: y_0, T_1: y_1, \ldots, T_n: y_n)$ where each $y_j$, for $0 \leq j < n$, defines a value for some feature of the domain. Thus, the notation $M_i^S[Y]$ refers to a histogram that can be read as 'the resulting scenarios given by source S of sub-process i operating in scenario Y'.

Another concept borrowed from the techniques described in U.S. patent application Ser. No. 15/223,472 relates to the data distribution, in order to allow substantially maximum parallelism: in order to provide efficiency for the composition of execution maps, they are stored as distributed tables that use the input features to hash the data related to massive amount of executions across multiple nodes. In this way, it is possible to minimize the computational costs associated with data movement when dealing with these datasets.

In one or more embodiments, the methods described in U.S. patent application Ser. No. 15/223,472 enable the combination of executions with similar input and output features from multiple heterogeneous sources into additional execution maps. The method in that invention relies on such a combination to create execution maps that cover as many scenarios as possible. In the present invention, as described in the following sections, a more granular and dynamic combination of execution maps is allowed, where each possible scenario given by an execution map can be linked to a scenario in a distinct map of the following sub-process, ensuring substantially maximum fitness.

Algorithms

Besides the concepts described in the previous section, the description of the method proposed in the present invention makes use of some auxiliary algorithms defined in U.S. patent application Ser. No. 15/223,472. This section is included for reference purposes and may be consulted as needed when reading the algorithms in the section entitled "Dataset Selection Based on Fitness."

The algorithms described below assume the representation of tables as lists of rows, represented by elements within brackets. The algorithms are:

merge ($Q_1$, $Q_2$)—Merges two tuples into one, using the tuples' schemas $\mathbb{T}(Q_1)$ and $\mathbb{T}(Q_2)$. All features that are both in $Q_1$ and $Q_2$ should have the same value in order to merge the tuples. The resulting tuple contains such features and the features that belong uniquely either to $Q_1$ or $Q_2$. In addition, the resulting tuple can contain composite features that are dynamically computed by means of a global set of merging functions, which is assumed to be provided.

These merging functions can deal with features that depend on values of other features. This is typically useful to compute the target feature, which usually depends on contributions from various sub-processes. The current merging strategy for the target feature t determines how its value calculated so far is updated. In the exemplary example with global lead time as the target feature, the partial times of the sub-processes are accumulated. Other kinds of functions could be specified by the users.

The merge algorithm returns the merged tuple.

group_by (H, F)—receives two inputs: a histogram H and a list of features F. The group_by algorithm iterates over all elements (c, Q) in H, operating over the tuple Q. It discards all items in Q whose features are not in F. Then, all elements $(c^1, Q), (c^2, Q), \ldots, (c^m, Q)$, where tuples Q are the same, are grouped into a single element (C, Q) where $$C = \sum_{i=1}^{m} c^i.$$

As the histograms are distributed according to the values of input features of the next execution map, which are a subset of all future features, tuples that can be grouped are always on the same node and therefore these operations can occur in an embarrassingly parallel fashion. The group_by algorithm returns the grouped histogram.

append (l,i)—Inserts the item i as the last element of the list l. This function is used to handle histograms represented by lists of elements (c, Q), and is presumed to leverage the data distribution strategy of storing execution maps as tables hashed according to their input features. The operation is in-place and the list l is changed after the operation.

GeneratePDF (hist)—Given a histogram of values of the target feature, returns a probability distribution function of that target feature. FIG. 7 illustrates exemplary pseudo code of a Generate PDF process 700 according to one embodiment of the invention. Generally, as shown in FIG. 7, given a histogram of values, hist, of the target feature as input, the exemplary GeneratePDF process 700 generates a pdf from the histogram of values. The exemplary implementation of the GeneratePDF process 700 applies normalization, although more complex implementations could interpolate the target feature values, as would be apparent to a person of ordinary skill in the art.

first (l)—Returns the first element of list structure 1, removing it from the list. The operation is in-place, and the list l is changed after the operation.

Dataset Selection Based on Fitness

The main object of this invention is a method for composing a model representing the operation of a real-world complex process, under a user-specified scenario, and regarding a user-specified target feature. This method is an extension of the method described in U.S. patent application Ser. No. 15/223,472, where the datasets were chosen by the user. In the present invention, multiple datasets for each sub-process might be available and all of them might need to be considered in order to generate accurate probability distributions. In one or more embodiments of the present invention, the user is not required to specify the datasets, and the substantially fittest possible results are combined into a probability distribution function of the target feature.

The disclosed method is based on combining the substantially fittest datasets that represent parts of the complete process under a user-specified scenario. For this, it is assumed that a fitness score has been precomputed for each scenario in each available dataset—as a real value between 0 and 1, where higher values denote higher confidence on the results as representative of the behavior of the sub-process under the conditions defined by the scenario. This follows a general assumption that model building and evaluation activities generally involve iteratively refining the model in order to substantially maximize the reproduction of the system's behavior. See, e.g., J. Sterman, *Business Dynamics*, (2000; New York, N.Y., USA: McGraw-Hill, Inc.), incorporated by reference herein in its entirety.

Automatic Combination of Substantially Fittest Execution Maps

Recall that an execution map captures the behavior of a sub-process under certain scenarios. The combination of these execution maps reproduces the effect of a simulation of the complete process, even if no such holistic simulation model is available, and potentially allowing a mix between simulated data and data captured from the real-world operation. The method presented in this section leverages the fitness value associated to each scenario in each execution map in order to perform such a combination.

The exemplary method operates given an initial scenario of interest and generates a probability distribution function of a target feature. With this function at hand, the user can estimate values for the target feature in a specific provided scenario in real time, without the need to build or run a complex simulation that covers the entire process. FIG. 8 illustrates exemplary pseudo code of a MPPCompose process 800 according to one embodiment of the invention. Generally, the exemplary MPPCompose process 800 implements a heuristic massively parallel search where the best paths are expanded first; substantially guaranteed to return the "best" result if the heuristic applied is admissible. See, e.g., R. Dechter, and J. Pearl, Generalized Best-First Search Strategies and the Optimality of A*. *J. ACM*, 32(3), 505-536 (July 1985), incorporated by reference herein in its entirety. The exemplary MPPCompose process 800 also enables the consideration of user preferences for the composition when generating search paths.

In this section, an algorithmic definition of the exemplary MPPCompose process 800 is provided, with search-space pruning and extended features that are parts of the novel aspects of the method. Details on the massively parallel implementation and possible search-space pruning techniques are presented in the section entitled "Massive Parallelism."

In the descriptions below, the following is assumed:
For any sub-process $p_i$, given by its index i:
a set $\mathbb{M}_i$ of all execution maps related to i is globally accessible;
a set of the input features of maps in $\mathbb{M}_i$ is globally accessible;

A globally accessible set of merging functions. At any step of the composition considering a sub-process, these functions can combine the previous values of any composite feature with the value obtained in the current sub-process, yielding a new partial value. For example, target features like 'total processing time' may correspond to the accumulation of values throughout the process and merging functions progressively compute them.

As described in the Algorithms Section, tables are represented as lists of rows;

Histograms are stored as tables in the exemplary implementation, represented in the algorithms by lists with elements (c, Q) where c is the count and Q is itself a tuple of features. The term [ ] represents an empty list and a call to algorithm append of the form append (T, (c, Q)) adds row (c, Q) to list T.

As shown in FIG. 8, the exemplary MPPCompose process 800 receives as input a tuple $s_o$ describing an initial scenario, a threshold of the minimum fitness acceptable (0, in the most general case) and n as the index of the last sub-process to be considered (thus, allowing the user to query a simulation of the n-first sub-processes). The exemplary MPPCompose process 800 returns a histogram of the values of the target feature given by the substantially fittest combination of execution maps. The returned histogram can be transformed into a pdf through straightforward normalization, as discussed above in conjunction with FIG. 7.

The exemplary MPPCompose process 800 starts by composing a histogram representing a single instance of this initial scenario as ini_hist (line 1). A priority queue frontier is used to guide the search. The frontier queue holds tuple elements of the form (e, f, H, i) where e and f are fitness scores (between 0.0 and 1.0), H is a histogram, and i is the index of a sub-process. Semantically, each element in frontier represents a distribution of the target feature of a path up to sub-process i−1, assuming the starting condition given by the initial scenario as a virtual sub-process 0.

The first element of the tuple, e, is the estimated fitness value of the distribution H at the end of the process; while f is the actual fitness value computed so far for H up to sub-process i−1. Elements e and f correspond to the heuristic and accumulated costs, respectively, as in heuristic search algorithms.

Hence, frontier is initialized with a single element (1.0, 1.0, ini_hist, 1) through a call to add. This add algorithm adds a new tuple to frontier sorted by the estimated fitness value. Thus, by construction, the first element of frontier is substantially guaranteed to be the element with the highest estimated fitness. This means that for any two elements $E_1=(e_1, f_1, H_1, i)$ and $E_2=(e_2, f_2, H_2, j)$ in frontier, if $e_1 > e_2$, then $E_1$ comes before $E_2$ regardless of the values of i and j.

The frontier elements are consumed in a loop (lines 3-12) that starts with the first element of frontier retrieved as a tuple (_, curr_fit, curr_hist, curr_index) through a call to a straightforward auxiliary algorithm first, which removes and returns the first element of a list structure. Notice that once an element is removed from the frontier its estimated fitness value is no longer necessary and therefore is discarded (represented in the algorithm by the don't-care symbol underscore "_").

The loop repeats until frontier becomes empty, or until curr_index is greater than the index of the last sub-process, n, terminating the search. The section entitled "Massive Parallelism" describes a possible implementation where more than one element can be removed from the frontier at once and processed in parallel.

In the first case, when frontier is empty, the loop ends without a valid solution and the algorithm returns failure, represented by an empty distribution with a fitness of 0 (line 13). Since, in the most general implementation, the algorithm is substantially guaranteed to find a solution if it exists, this is only the case when no possible solutions exist. If the user provides a threhsold value greater than 0, or if search-pruning techniques are implemented, then the algorithm may return with no solution in cases where one exists (although with a small fitness score).

In the second case, when an element that reached the end of the process is selected for expansion, the algorithm returns the distribution achieved in that path and its fitness (lines 5-6).

Each iteration of the loop consists of combining the current histogram (curr_hist), combined with maps of sub-process $p_{current\_index}$. Each tuple in curr_hist is paired with a map that contains a scenario that covers that tuple. Each eligible set of such pairings is a match in the computation.

All the possible matches are collected by the GenMatches process 900, as discussed further below in conjunction with FIG. 9. Each match is computed independently, generating a new histogram and a computed fitness value that configures a new candidate to be inserted in frontier. Since these computations are independent, this is a point of parallelism in the implementation of the exemplary parallel method discussed below. Finally, for each of the matches, a new element is added to the frontier if that candidate's fitness is greater than the acceptance threshold given by the user.

These topics are discussed in the following sections. First, a description is provided of how the matches are collected, and also how the evaluation of the pre-calculated fitness allows for the checking of user preferences. Then, a description is provided of how each match is computed, generating new candidates to be inserted in the frontier, and how heuristic methods can be used to efficiently traverse the search-space. Finally, the massively parallel aspects of the disclosed algorithm are presented, and an implementation with search-space pruning techniques.

Generating Matches and Evaluating User Preferences

FIG. 9 illustrates exemplary pseudo code of a GenMatches process 900 according to one embodiment of the invention. Generally, the exemplary MPPCompose process 800 relies on an auxiliary GenMatches process 900 to return a list of all possible next scenario-map combinations. As shown in FIG. 9, the exemplary GenMatches process 900 receives as input a histogram H and the sub-process $p_{index}$ and generates a structure that holds all possible alternatives, combinations of rows (c, Q) in H to maps of i that contain scenarios with Q.

The exemplary GenMatches process 900 also receives a threshold which serves to discard all possible matches where the fitness, evaluated accordingly to the users preferences, is too low. In a most general application, this threshold value would be 0, and any valid match would be considered for generation of alternatives, as discussed further below in the Massive Parallelism section.

The exemplary GenMatches process 900 operates first by collecting all possible next maps for each row (c, Q) in the histogram H, and then through a call to an auxiliary GenAlternatives process 1000, as discussed further below in conjunction with FIG. 10, generates a list of combinations of one next map for each row.

FIG. 10 illustrates exemplary pseudo code of a GenAlternatives process 1000 according to one embodiment of the invention. In one exemplary implementation, the GenAlternatives process 1000 generates all such possible combinations, given the list of available pairs.

An additional topic related to this section and further discussed in the Massive Parallelism section is how possible implementations of the GenMatches process 900 and the GenAlternatives process 1000 could help limit the search-space in heuristic manners.

Figure 11:
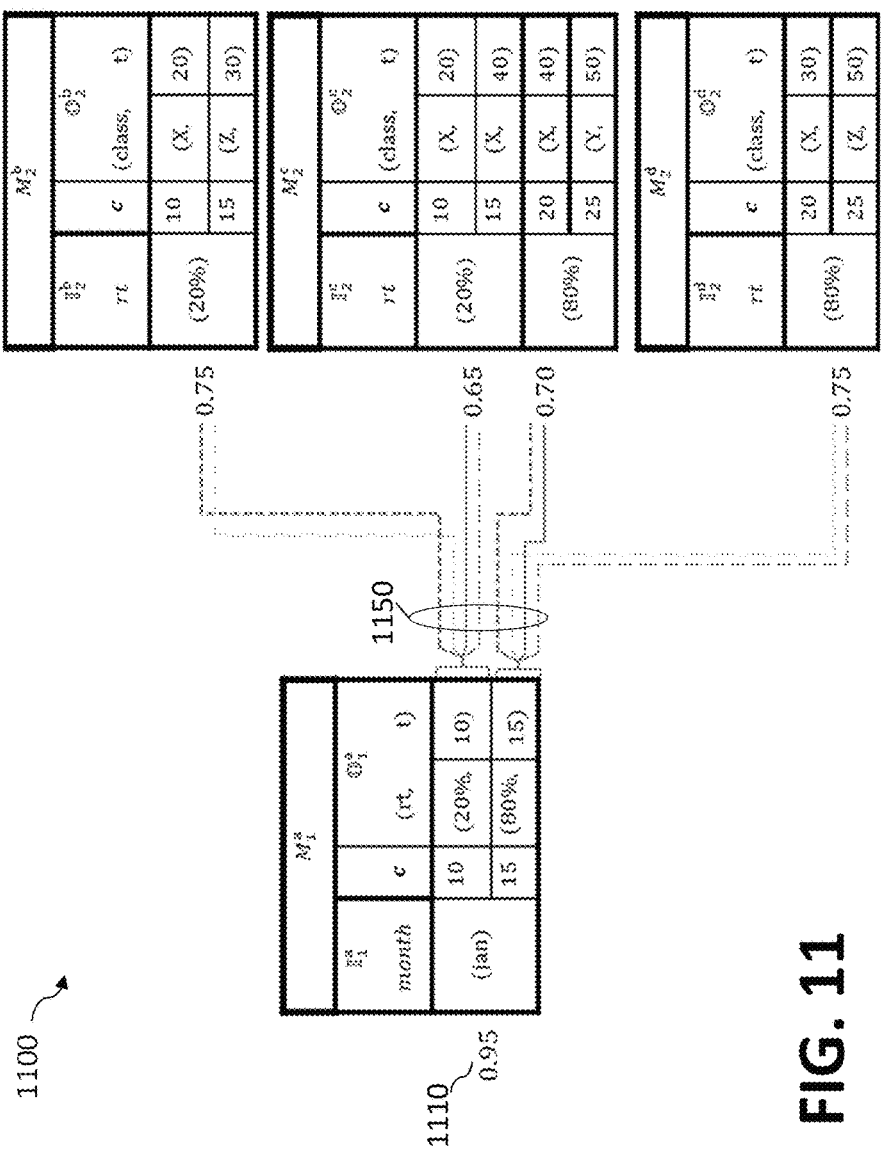
FIG. 11 illustrates an exemplary generation by the exemplary GenMatches process of FIG. 9 of possible combination matches given a histogram.

FIG. 11 illustrates an exemplary generation 1100 by the exemplary GenMatches process 900 of FIG. 9 of possible combination matches given a histogram, represented by $M_1^a$[month: jan]. In the notation of FIG. 11, each style of dotted line 1150 configures a different match (i.e., a combination of tuples in the input histogram ($M_1^a$[month: jan]) to scenarios in maps of the following sub-process. In total, the example of FIG. 11 generates four matches. As shown in FIG. 11, each scenario has an associated fitness value, such as fitness value 1110. Generally, the fitness values 1110 may be pre-calculated or provided by a user specialist.

Figure 12:
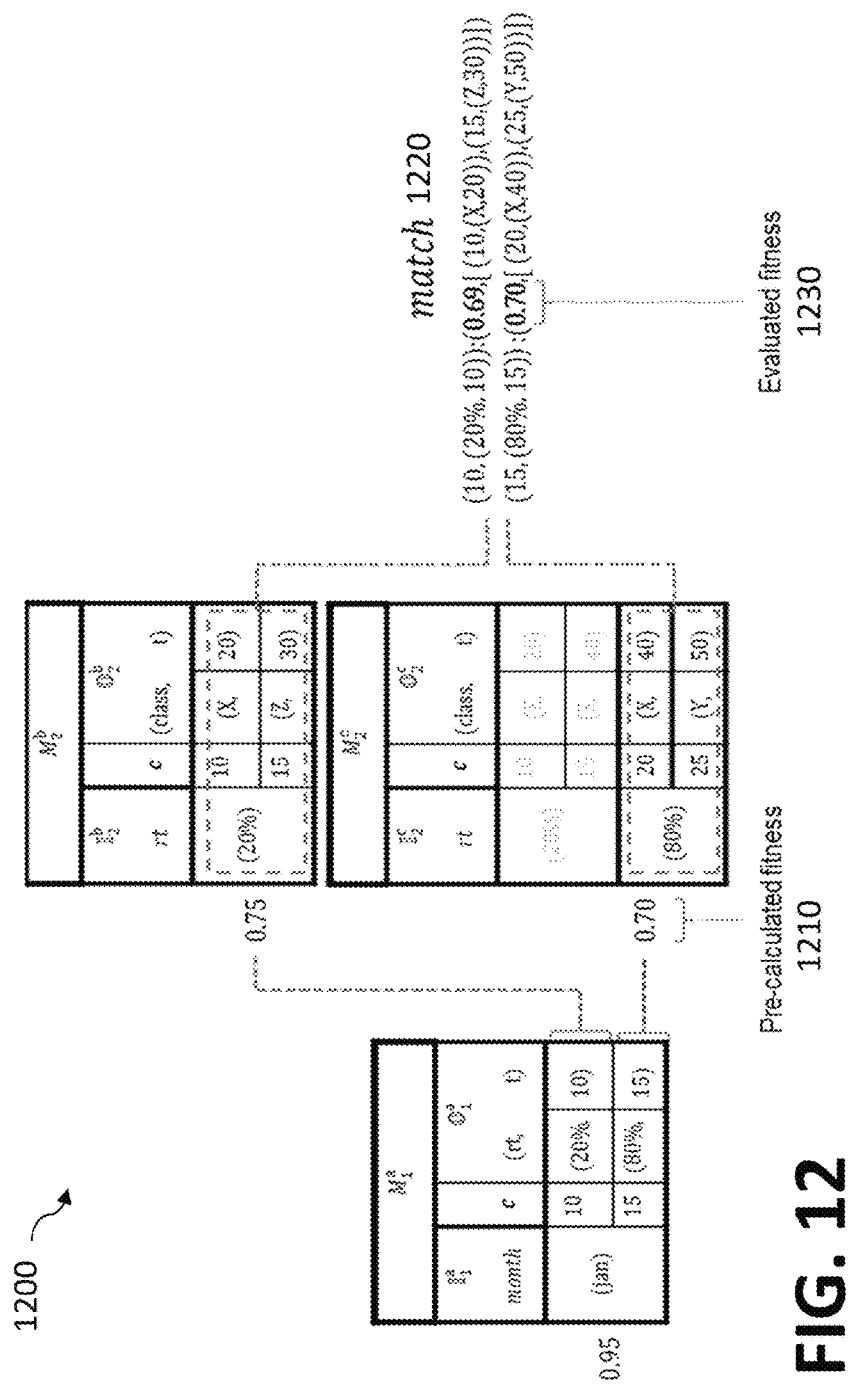
FIG. 12 illustrates an example of one match generated between tuples in an input histogram to scenarios in maps of the following sub-process from the example of FIG. 11.

FIG. 12 illustrates an example of one match 1200 generated between a tuple in the input histogram ($M_1^a$[month: jan]) to scenarios in maps of the following sub-process from the example of FIG. 11. Tuple (10, (20%, 10)) in $M_1^a$ [month: jan] is paired with $M_2^b$[rt: 20%] and tuple (15, (80%, 15)) with $M_2^c$[rt: 80%]. As in the previous examples, the feature rt represents the container occupation ratio. In the example of FIG. 12, the generated match 1200 associates the first tuple in $M_1^a$[month: jan] to $M_2^a$[rt: 20%] and the second tuple in $M_1^a$[month: jan] to $M_2^c$[rt: 80%].

In the example of FIG. 12, the resulting evaluated fitness values 1230 for a match 1220 are not the pre-calculated fitness values 1210 recorded in the maps for those scenarios. Recall from the GenMatches process 900 (FIG. 9) that only maps having an evaluated fitness 1230 above the threshold in the scenario given by the row (c, Q) are considered (line 6). In one or more embodiments, the fitness of a scenario in a map is given by a call to EvaluatePreferences, an auxiliary algorithm (line 5).

The EvaluatePreferences algorithm handles the user preference mechanism. The EvaluatePreferences algorithm receives as input a map M, a tuple Q, and the sub-process index i, and returns a fitness value for that scenario in that map, in the context of the composition algorithm. This is referred to as the evaluated fitness 1230, which considers the (optional) global set of preferences defined by the user for the sub-process $p_i$. In practice, these preferences are functions that modify the value of the pre-calculated fitness 1210 for M [Q].

Thus, in one or more embodiments:
If no preferences apply to sub-process i, EvaluatePreferences returns the pre-calculated fitness of M[Q];
If there are preferences expressing constraints over a feature's values, and the scenario Q contains those values, EvaluatePreferences returns a fraction of the pre-calculated fitness;
If there are preferences expressing desirable events that the user would like to explore, and the scenario Q indicates those events, the function returns a product of the pre-calculated fitness. The function can therefore arbitrarily increase the fitness of a scenario in a map up to the maximum threshold of 1;
If there are preferences expressing a necessary condition and the condition is not met by Q, EvaluatePreferences returns 0;
By definition, if M [Q] is not valid, EvaluatePreferences also returns 0.
Through the EvaluatePreferences function, the user preferences throughout the entire process can be taken into account. It is noted that an implementation of EvaluatePreferences is highly dependent on the language used to express the constraints and user preferences, and that is beyond the scope of the present invention, as would be apparent to a person of ordinary skill in the art. As an example, consider the model checking algorithms described in E. M. Clarke et al., "Automatic Verification of Finite-state Concurrent Systems Using Temporal Logic Specifications," ACM Trans. Program. Lang. Syst, 8(2), 244-263 (April 1986), incorporated by reference herein in its entirety. Given constraints expressed in temporal logic formulae over the domain features, the described model checking algorithms are capable of determining whether a sequence of scenarios (expressed as feature values) satisfy those formulae. In such an implementation, the index of the sub-process i could represent a time instant.

Computing Histograms and Heuristic Fitness Values

FIG. 13 illustrates exemplary pseudo code of a ComputeHistogram process 1300 according to one embodiment of the invention. As discussed hereinafter, each pairing of tuple and next histogram is processed in order to compose a resulting histogram and its estimated and current fitness values.

First, the resulting histogram for this path is initialized as an empty table, represented by the empty list ([ ], line 1), with a fitness of 0 (line 2). Additionally, an auxiliary variable total_counts is used (line 3), initialized as 0.

Recall that the GenMatches process 900 generates match as a list of terms that pair a row of the current histogram to a histogram of the next sub-process that contains that row as a scenario (see, e.g., FIG. 12). Thus, each term in match is of the form $(c_i, Q_i)$: $(f_j$,next_hist) where $Q_i$ is a tuple in the current histogram, $c_i$ is the count of $Q_i$, and next_hist is a histogram of the next sub-process that implements $Q_i$ with a fitness $f_j$ greater than 0.

As shown in FIG. 13, the loop in the ComputeHistogram process 1300 (in lines 4-10) is responsible for merging each $(c_i, Q_i)$ with its associated next_histogram, and computing its contribution to res_fit, the fitness of the resulting histogram. The loop starts (line 5) by incrementing the total_counts counter with $c_i$. This is necessary to later renormalize res_fit to a value between 0 and 1.0, since (line 6) each next_histogram contributes its fitness multiplied by $c_j$ to res_fit.

It is the inner loop of the ComputeHistogram process 1300 in lines 7-10 that effectively computes the composed counts (line 8), merges the tuples (line 9) and appends the resulting tuple to res_hist (line 10).

The loop is performed for every pair or tuples $(c_j, Q_j)$ and $(c_1, Q_1)$, where the first tuple comes from the current histogram and the second tuple is obtained from the histogram that was paired to it in this match. A new tuple $(c_n, Q_n)$ is generated and stored in res_hist through a call to append (0). These operations are a point of parallelism, since each pair of tuples can be independently considered, as discussed below in the section entitled "Massive Parallelism."

In one or more embodiments, the count for each tuple of the histogram is obtained by multiplying the counts of the original tuples. This means that each output in the current histogram causes each of the $c_j$ results a $c_i$ number of times in the resulting histogram. The resulting scenario tuple $Q_n$ is obtained by merging the input and output tuples $Q_i$ and $Q_j$, through a call to the auxiliary function merge (0).

After this inner loop in lines 7-10, the resulting fitness value res_fit and the estimated fitness value heuristic_fit are computed (line 11). First, res_fit is renormalized (divided by total_counts). This means that the requirement of having fitness values between 0 and 1 is guaranteed in the exemplary embodiment. It is also multiplied by the fitness of the current histogram, curr_fit, since the composite histogram now represents an additional sub-process, but entails a level of uncertainty that is dependent on the confidence of the current histogram. Finally, heuristic_fit is given by this fitness value multiplied by a heuristic factor. This is represented, in the algorithm, by a call to EstimateFit (line 12).

In one or more embodiments, the use of a path-dependent evaluation heuristic positively impacts on the performance of the algorithm, still substantially guaranteeing optimality if the heuristic is admissible. See, e.g., R. Dechter, & J. Pearl, Generalized Best-First Search Strategies and the Optimality of A*. *J. ACM,* 32(3), 505-536 (July 1985), referenced above. Since the generated histograms are inserted into the frontier as candidates ordered by their fitness, prioritizing the candidates with a good future-fitness estimate is important in order to speed up the algorithm. In the above description of the ComputeHistogram process 1300, an implementation of EstimateFit is assumed in which the fitness is given in function of the histogram.

The resulting histogram res_hist is grouped by all the features that are still necessary in subsequent sub-processes, discarding those that are unnecessary, through a call to group_by (0). Notice that the execution of group_by is important to prune unnecessary tuples, and thus reduce the combinatorial nature of the process.

Recall that, in one or more embodiments, all the input features of the maps of a sub-process are known and globally accessible (as described above in the list of assumptions). A function GetFutureFeatures is assumed which receives the index of a sub-process and returns a list of all the input features of the subsequent sub-processes. This function is necessary, in one or more embodiments, to obtain the second parameter of the call to group_by, given by a call to GetFutureFeatures receiving curr_index (line 13).

The resulting histogram, its associated fitness and the incremented index (indicating that the resulting histogram is a histogram of that next sub-process) are returned in line 14, to be added to the frontier.

Massive Parallelism

In this section, aspects of a massively parallel implementation of the algorithm described above are highlighted and discussed. Consider three levels of parallelism in one or more embodiments: processing more than one candidate in parallel; processing multiple matches of the candidate histogram in parallel; and computing the merging and grouping of histograms in parallel.

In the exemplary MPPCompose process 800, described above in conjunction with FIG. 8, the first element in the ordered list frontier is removed from the list and processed as candidate. The computation of all candidates in the list is independent from each other, aside from the implicit ordering in the removal and the insertion of new candidates. Thus, if k computational nodes are provided, k candidates can be removed from the frontier and processed in parallel.

In order to substantially guarantee that a suboptimal candidate with returns first is not chosen over an optimal candidate that takes more time to process, a synchronization mechanism is required. By labeling each candidate removed from the frontier with the absolute position it was inserted in the list, it is possible to infer priority of results. Then, upon obtaining a candidate's result, if candidates with higher priority are still being computed, the returned value needs to be held until those candidates are processed.

If an optimal answer is not required, the first result with a fitness above the user-defined threshold can be immediately returned, offering a potentially great speed up of the process. Alternatively, an optional number of results can be gathered and the best of those first to respond is ultimately selected.

The second level of parallelism is that of processing multiple matches independently. In the exemplary MPP-Compose process 800, in the loop of lines 8-11, the only interdependence between the matches is that of the insertion in the frontier. Thus, a variable number of matches can be computed in parallel, according to the computational resources available. In order to allow this second level of parallelism, some synchronization strategy might be necessary in order to substantially guarantee concurrent access to the frontier structure without problems. An exclusive-lock mechanism should suffice, as the candidates are inserted in the frontier ordered by their fitness value.

The third level of parallelism, in one or more embodiments, is recalled from U.S. patent application Ser. No. 15/223,472. In the exemplary ComputeHistogram process 1300, the loop in lines 7-10 can operate with each tuple in next_hist in parallel. As discussed further above, data locality can be explored to further allow this level of parallelism.

Search-Space Pruning

In one or more embodiments, heuristic and search-space pruning techniques can be leveraged for more manageable computation times. The combinatorial nature of the match-generation steps of the disclosed method demands that some strategy be applied to prune the number of possible search paths, as no level of parallelism is capable of dealing with the potential combinatorial explosion in larger domains.

In order to tackle the combinatorial nature of the problem, the algorithm may be implemented with heuristic aspects. The application of good heuristic methods for the estimation of the fitness values is capable of mitigating this problem, as the best-first nature of the algorithm tends to find the substantially optimal result without expanding unnecessary candidates in the average case. See, for example, R. Dechter, and J. Pearl, The Optimality of A*, *Search in AI* (Amsterdam; 1988), incorporated by reference herein in its entirety. Moreover, if completeness and optimality (substantial guarantee of the best solution) are not required, these aspects can be traded for greater speedups provided by the application of non-admissible heuristics. See, e.g., R. Dechter, and J. Pearl, Generalized Best-First Search Strategies and the Optimality of A*. *J. ACM,* 32(3), 505-536 (July 1985), referenced above.

In addition to the need to expand a large number of candidates, the size of the frontier in memory can itself be a problem for practical implementations. For this purpose, many search algorithms apply the strategy of retracting candidates from the frontier. See, for example, M. Evett et al., "PRA*: Massively Parallel Heuristic Search," *Journal of Parallel and Distributed Computing,* 2(25), 133-143 (1995), incorporated by reference herein in its entirety.

In one or more embodiments of the present invention, the search space is pruned in the form of the threshold parameter. This parameter is passed to the GenMatches process 900 and any map is discarded whose conditional immediate fitness value (after being evaluated against the user's preferences) is lower than the fitness. However, since the candidates are stored and processed in one or more exemplary embodiments in order of estimated fitness in the frontier, this mechanism may not speed up the search, but greatly reduces the number of candidates to be kept in memory. Through this strategy, the algorithm may terminate with failure if no candidate with a possible fitness greater than the threshold can be generated.

Another possible mechanism, in the GenMatches process 900, involves limiting the generation of alternatives through the GenAlternatives process 1000. FIG. 10 illustrates an exemplary implementation of this algorithm, in which every single combination of tuple-map is generated, but alternative implementations could reduce the number of resulting matches by limiting the number of possible maps to be paired with the output tuples in the current histogram, as would be apparent to a person of ordinary skill in the art.

EXAMPLES

This section provides examples of domains in which the disclosed method could be applied, providing competitive advantages through the combination of simulation results and various datasets collected from real-world observations. The examples are based on experience in research and consulting projects and do not configure a complete list of all possible applications of the method.

Supply Chain Logistics

Complex supply chain logistics processes, like in the Oil and Gas and Healthcare industries, are comprised of many sub-processes, and often must deal with thousands of types of materials, as well as multiple policies and external events. These processes are usually reliant on simulation systems in order to predict faults and eliminate bottlenecks, and typically store large volumes of data as operational logs. The combination of these datasets into probability distribution functions of target features, such as lead times for delivery of goods, is an example of the application of the disclosed method.

Chemical Engineering Processes

Chemical Engineering processes comprising various transformations that generate different sub-products and in varying proportions under different scenarios are also candidates for the application of the disclosed method. Managers and automated systems in highly complex engineering domains can make use of the real-time aspects of the disclosed method for monitoring and decision making.

Economic Analysis

The analysis of the impact of economic policies and the study of the effect of propagation of economic scenarios are also interesting applications of the disclosed method. Financial markets, for example, provide huge amounts of data records which, through the disclosed method, can be used to generate probability distribution functions of features that are hard to simulate due to high uncertainty or aspects of the domain, like the seasonality of the data.

Retail Management

In retail markets, the study of the expected outcome of sales with various phases, and events within each phase, is also an example of how probability distribution functions generated by the method can help in decision making. Consumer forecast can, for example, indicate policies for stock level management.

CONCLUSION

In the digital age, long scientific experiments and complex business workflows, such as those in the supply chain domain, generate multiple large datasets resulting from simulations and real-world observations. These datasets usually correspond to various sub-processes of a more complex process. Typical queries over these domains demand the computation of distribution probabilities for target features of the complete process. The linkage of possible scenarios of each sub-process needs to be considered to answer such queries. In one or more embodiments, each output scenario of a sub-process is mapped to multiple input scenarios of the next sub-process and this mapping has a specific fitness level. In this way, the resulting fitness of a probability distribution for a target feature depends on the propagation of the fitness throughout the possible scenarios of the sub-processes. Searching for the substantially fittest composition from an initial scenario is a significant combinatorial problem as it is necessary to take into account multiple scenarios of all alternative datasets for each sub-process.

One or more embodiments of the present invention address this combinatorial problem by performing a massively parallel heuristic search. The disclosed method enables the composition of probability distributions of a target feature at query-time, which would otherwise be unfeasible. One or more embodiments of the disclosed method are capable of substantially guaranteeing the substantially fittest composition and can be parameterized to tradeoff this guarantee for even faster results. In this way, it is possible to timely obtain accurate distribution probabilities of key features that are important for decision making in complex big data domains such as supply chain logistics and massive scientific experiments.

The foregoing applications and associated embodiments should be considered as illustrative only, and numerous other embodiments can be configured using the techniques disclosed herein, in a wide variety of different applications.

It should also be understood that the techniques for combining results of previous simulations of portions of a simulated process, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for combining results of previous simulations of portions of a simulated process may be implemented using one or more processing platforms. One or more of the processing modules or other components may therefore each run on a computer, storage device or other processing platform element. A given such element may be viewed as an example of what is more generally referred to herein as a "processing device."

Figure 14:
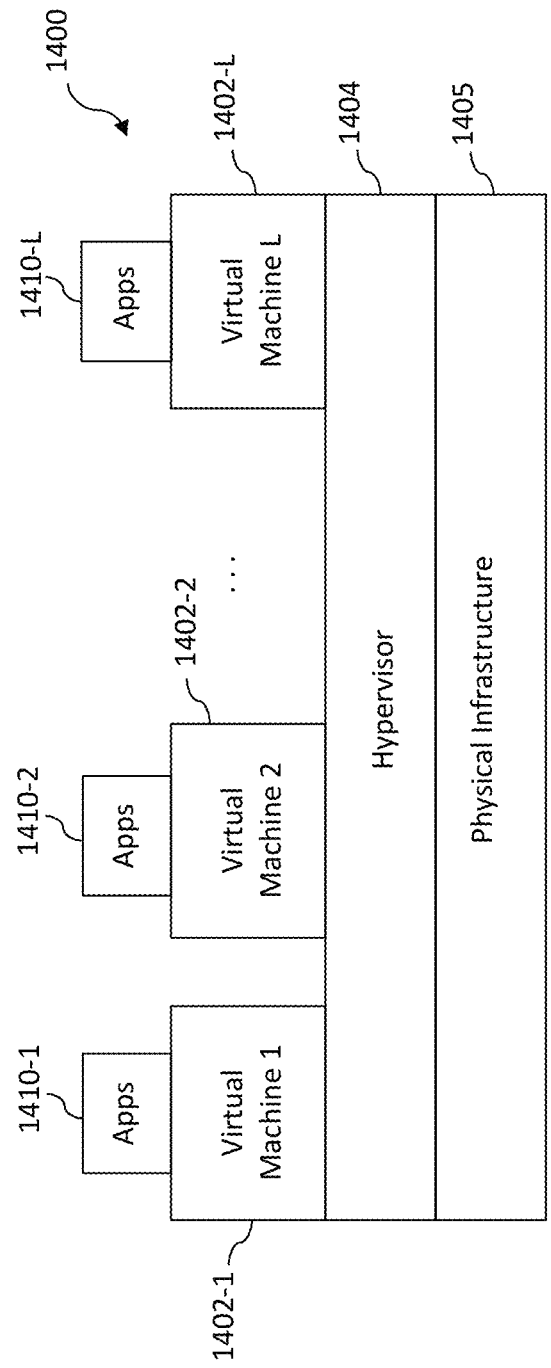
FIG. 14 illustrates an exemplary processing platform that may be used to implement at least a portion of one or more embodiments of the invention comprising a cloud infrastructure.

Referring now to FIG. 14, one possible processing platform that may be used to implement at least a portion of one or more embodiments of the invention comprises cloud infrastructure 1400. The cloud infrastructure 1400 in this exemplary processing platform comprises virtual machines (VMs) 1402-1, 1402-2, . . . 1402-L implemented using a hypervisor 1404. The hypervisor 1404 runs on physical infrastructure 1405. The cloud infrastructure 1400 further comprises sets of applications 1410-1, 1410-2, . . . 1410-L running on respective ones of the virtual machines 1402-1, 1402-2, . . . 1402-L under the control of the hypervisor 1404.

The cloud infrastructure 1400 may encompass the entire given system or only portions of that given system, such as one or more of client, servers, controllers, or computing devices in the system.

Although only a single hypervisor 1404 is shown in the embodiment of FIG. 14, the system may of course include multiple hypervisors each providing a set of virtual machines using at least one underlying physical machine.

An example of a commercially available hypervisor platform that may be used to implement hypervisor 1404 and possibly other portions of the system in one or more embodiments of the invention is the VMware® vSphere™ which may have an associated virtual infrastructure management system, such as the VMware® vCenter™. The underlying physical machines may comprise one or more distributed processing platforms that include storage products, such as VNX™ and Symmetrix VMAX™, both commercially available from EMC Corporation of Hopkinton, Mass. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of system. Containers may be used in combination with other virtualization infrastructure such as virtual machines implemented using a hypervisor.

Figure 15:
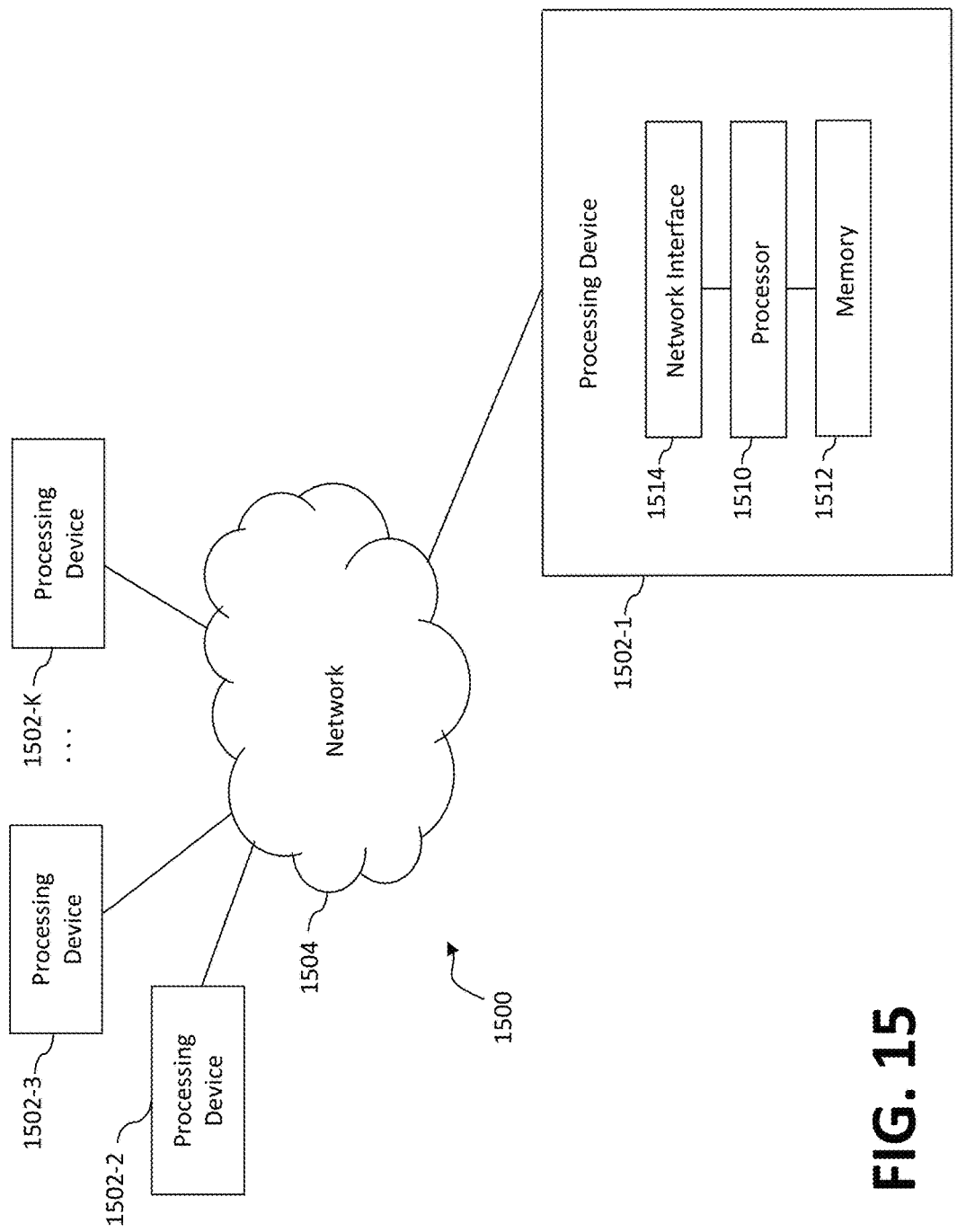
FIG. 15 illustrates another exemplary processing platform that may be used to implement at least a portion of one or more embodiments of the invention.

Another example of a processing platform is processing platform 1500 shown in FIG. 15. The processing platform 1500 in this embodiment comprises at least a portion of the given system and includes a plurality of processing devices, denoted 1502-1, 1502-2, 1502-3, . . . 1502-K, which communicate with one another over a network 1504. The network 1504 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1502-1 in the processing platform 1500 comprises a processor 1510 coupled to a memory 1512. The processor 1510 may comprise a microprocessor, a microcontroller, an application specific integrated circuit (ASIC), a field programmable gate array (FPGA) or other type of processing circuitry, as well as portions or combinations of such circuitry elements, and the memory 1512, which may be viewed as an example of a "computer program product" having executable computer program code embodied therein, may comprise random access memory (RAM), read only memory (ROM) or other types of memory, in any combination.

Also included in the processing device 1502-1 is network interface circuitry 1514, which is used to interface the processing device with the network 1504 and other system components, and may comprise conventional transceivers.

The other processing devices 1502 of the processing platform 1500 are assumed to be configured in a manner similar to that shown for processing device 1502-1 in the figure.

Again, the particular processing platform 1500 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 14 or 15, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

Also, it should again be emphasized that the above-described embodiments of the invention are presented for purposes of illustration only. Many variations and other alternative embodiments may be used. For example, the disclosed techniques are applicable to a wide variety of other types of communication systems, storage systems and processing devices. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method, comprising the steps of:

obtaining, for a process comprised of a sequence of a plurality of sub-processes, an identification of a plurality of relevant input features and output features for each of said sub-processes;

obtaining at least one execution map for each of said sub-processes, wherein each execution map stores simulated results of at least one execution of a given sub-process originated from at least one data source, and wherein said simulated results comprise a scenario, configured by a substantially same tuple of input features, a distribution, configured by a count of a number of times a given tuple of output features appeared given said scenario, and a fitness value of said distribution as being representative of at least one of said sub-processes under said scenario; and in response to one or more user queries regarding at least one target feature, selected among features of the sub-processes, and an initial dataset comprised of a user-provided initial scenario comprising values of the plurality of relevant input features of a first sub-process, performing the following steps, using at least one processing device:

combining, using parallel processing techniques, said initial dataset with a plurality of simulated results selected from the at least one execution map for a first sub-process in said sequence of sub-processes, by matching the input features of said one or more simulated results with features from said initial dataset, yielding one or more combined datasets with an evaluated fitness;

combining, using parallel processing techniques, for each next sub-process in said sequence of sub-processes, each available dataset from the combination of previous sub-processes in said sequence of sub-processes, with a plurality of simulated results selected from the at least one execution map for said next sub-process, by matching the input features of said plurality of simulated results with features from said initial dataset or from simulated results selected from execution maps of a previous sub-process in said sequence, yielding one or more combined datasets with an evaluated fitness;

composing a probability distribution function for said at least one target feature from one of said combined datasets that represents a simulation of the process and combines plurality of simulated results of each of sub-process in said sequence; and processing said probability distribution function to answer said one or more user queries for said at least one target feature.

2. The method of claim 1, wherein at least one sub-process has a plurality of said execution maps.

3. The method of claim 1, wherein said combining comprises, for a given one of said sub-processes, collecting possible matches between values of output features in said available dataset and input features in the at least one execution map of said given sub-process.

4. The method of claim 3, wherein said collecting only collects possible matches satisfying a predefined fitness threshold.

5. The method of claim 3, wherein said collecting further comprises adjusting a pre-calculated fitness value of one or more datasets based on an evaluation of one or more preferences defined by said user for said process.

6. The method of claim 5, wherein said one or more preferences defined by said user comprise one or more of desirable and undesirable characteristics of the process to be represented by the probability distribution function, stated as constraints over the input features that configure the scenario in said datasets.

7. The method of claim 3, wherein said collecting further comprises limiting the number of execution maps for a next sub-process in said sequence of said plurality of sub-processes to be paired with output features in said available dataset.

8. The method of claim 3, wherein the step of combining available datasets with the plurality of simulated results selected from execution maps of the at least one execution map comprises combining said available datasets with said possible matches.

9. The method of claim 8, wherein said combining further comprises one or more of (i) determining a heuristic fitness value; (ii) grouping the distribution in the resulting datasets by the features that are still necessary in subsequent sub-processes; (iii) processing a plurality of said possible matches in parallel; and (iv) prioritizing a computation of the available datasets with a substantially highest heuristic fitness value.

10. The method of claim 8, wherein a plurality of said available datasets are processed in parallel.

11. The method of claim 10, wherein said combining further comprises a synchronicity mechanism in the collecting of the results of said parallel processing of said available datasets, substantially ensuring that possible combinations are made available synchronously.

12. The method of claim 10, wherein said combining further comprises asynchronously collecting a number of results of said parallel processing of said available datasets, making said collected results available as they are processed, and wherein a probability distribution function is composed with a first available dataset that combines results of at least one execution map of each of said sub-processes in said sequence of sub-processes.

13. The method of claim 1, wherein a given fitness value denotes a level of confidence in the results as being representative of the behavior of the given sub-process under conditions defined by the initial scenario.

14. The method of claim 1, wherein said at least one execution map for each of said plurality of sub-processes are stored as distributed tables that use the relevant input features to hash data related to multiple executions across multiple nodes.

15. The method of claim 1, wherein said probability distribution function enables said one or more user queries regarding one or more of said target features to be processed for said process when said process has not been simulated in a single run.

16. A computer program product, comprising a non-transitory machine-readable storage medium having encoded therein executable code of one or more software programs, wherein the one or more software programs when executed by at least one processing device perform the following steps:

obtaining, for a process comprised of a sequence of a plurality of sub-processes, an identification of a plurality of relevant input features and output features for each of said sub-processes;

obtaining at least one execution map for each of said sub-processes, wherein each execution map stores simulated results of at least one execution of a given sub-process originated from at least one data source, and wherein said simulated results comprise a scenario, configured by a substantially same tuple of input features, a distribution, configured by a count of a number of times a given tuple of output features appeared given said scenario, and a fitness value of said distribution as being representative of at least one of said sub-processes under said scenario; and in response to one or more user queries regarding at least one target feature, selected among features of the sub-processes, and an initial dataset comprised of a user-provided initial scenario comprising values of the plurality of relevant input features of a first sub-process, performing the following steps:

combining, using parallel processing techniques, said initial dataset with a plurality of simulated results selected from the at least one execution map for a first sub-process in said sequence of sub-processes, by matching the input features of said one or more simulated results with features from said initial dataset, yielding one or more combined datasets with an evaluated fitness;

combining, using parallel processing techniques, for each next sub-process in said sequence of sub-processes, each available dataset from the combination of previous sub-processes in said sequence of sub-processes, with a plurality of simulated results selected from the at least one execution map for said next sub-process, by matching the input features of said plurality of simulated results with features from said initial dataset or from simulated results selected from execution maps of a previous sub-process in said sequence, yielding one or more combined datasets with an evaluated fitness;

composing a probability distribution function for said at least one target feature from one of said combined datasets that represents a simulation of the process and combines plurality of simulated results of each of sub-process in said sequence; and processing said probability distribution function to answer said one or more user queries for said at least one target feature.

17. A system, comprising:

a memory; and at least one processing device, coupled to the memory, operative to implement the following steps:

obtaining, for a process comprised of a sequence of a plurality of sub-processes, an identification of a plurality of relevant input features and output features for each of said sub-processes;

obtaining at least one execution map for each of said sub-processes, wherein each execution map stores simulated results of at least one execution of a given sub-process originated from at least one data source, and wherein said simulated results comprise a scenario, configured by a substantially same tuple of input features, a distribution, configured by a count of a number of times a given tuple of output features appeared given said scenario, and a fitness value of said distribution as being representative of at least one of said sub-processes under said scenario; and in response to one or more user queries regarding at least one target feature, selected among features of the sub-processes, and an initial dataset comprised of a user-provided initial scenario comprising values of the plurality of relevant input features of a first sub-process, performing the following steps:

combining, using parallel processing techniques, said initial dataset with a plurality of simulated results selected from the at least one execution map for a first sub-process in said sequence of sub-processes, by matching the input features of said one or more simulated results with features from said initial dataset, yielding one or more combined datasets with an evaluated fitness;

combining, using parallel processing techniques, for each next sub-process in said sequence of sub-processes, each available dataset from the combination of previous sub-processes in said sequence of sub-processes, with a plurality of simulated results selected from the at least one execution map for said next sub-process, by matching the input features of said plurality of simulated results with features from said initial dataset or from simulated results selected from execution maps of a previous sub-process in said sequence, yielding one or more combined datasets with an evaluated fitness;

composing a probability distribution function for said at least one target feature from one of said combined datasets that represents a simulation of the process and combines plurality of simulated results of each of sub-process in said sequence; and processing said probability distribution function to answer said one or more user queries for said at least one target feature.

18. The system of claim 17, wherein said combining comprises, for a given one of said sub-processes, collecting possible matches between values of output features in said available dataset and input features in the at least one execution map of said given sub-process.

19. The system of claim 18, wherein the step of combining available datasets with the plurality of simulated results selected from execution maps of the at least one execution map comprises combining said available datasets with said possible matches.

20. The system of claim 19, wherein a plurality of said available datasets are processed in parallel.

* * * * *